United States Patent [19]

Daenen et al.

[11] 4,257,854

[45] Mar. 24, 1981

[54] METHOD OF PRODUCING OBJECTS WITH A SUPERSMOOTH ALUMINUM SURFACE

[75] Inventors: Theo E. G. Daenen; Johannes M. Oomen; Joseph F. M. Van de Berg, all of Eindhoven, Netherlands

[73] Assignee: U.S. Philips Corporation, New York, N.Y.

[21] Appl. No.: 95,912

[22] Filed: Nov. 19, 1979

[30] Foreign Application Priority Data

Dec. 12, 1978 [NL] Netherlands .......................... 7812062

[51] Int. Cl.$^3$ .......................... C25D 5/52; C25D 7/08; C25D 3/44
[52] U.S. Cl. .................................... 204/36; 204/14 N; 204/19
[58] Field of Search ..................... 204/7, 14 N, 19, 36, 204/38 B

[56] References Cited

U.S. PATENT DOCUMENTS

| | | | |
|---|---|---|---|
| 2,108,604 | 2/1938 | Mason | 204/19 |
| 3,669,849 | 6/1972 | Schmidt | 204/19 |
| 3,929,611 | 12/1975 | Hess | 204/14 N |
| 4,032,413 | 6/1977 | Dotzer | 204/14 N |
| 4,145,261 | 3/1979 | Daenen | 204/14 N |

*Primary Examiner*—T. M. Tufariello
*Attorney, Agent, or Firm*—Norman N. Spain

[57] ABSTRACT

Method of producing objects having an aluminum surface of a supersmooth quality by applying an aluminum layer which is at least 10 micron thick onto the surface of the object from an electroplating bath and by thereafter subjecting the object to a mechanical machining precision operation. The aluminum layer is preferably electroplated by means of an anhydrous bath with an aprotic solvent.

4 Claims, No Drawings

METHOD OF PRODUCING OBJECTS WITH A SUPERSMOOTH ALUMINUM SURFACE

The invention relates to a method of producing objects with a supersmooth reflecting, aluminum surface, that is to say having a surface roughness $R_T$ of not more than 0.02 μm. Such objects having a very high quality surface are suitable for optical uses, for example in the form of mirrors for infrared telescopes or for the optical elements of video recording and display apparatus. Also for infrared apparatus there is a need to replace the germanium lenses, which are increasingly more difficult to obtain, by aluminum layers.

It is not possible to obtain the desired surface quality by machining the material, starting from rolled or pressed material or from material obtained by injection moulding or by vapour deposition.

An article by A. G. Buschow et al in Plating 55, 931–935 (1968) describes a method of producing such an object, namely an aluminum reflector. In accordance with this method a polished glass master is first rendered electrically conductive by means of an electroless plating solution. Thereafter an aluminum layer is deposited on the master by means of electroforming from a solution of an anhydrous aluminum salt and a hydride in an aprotic solvent. The formed reflector disc is then peeled from the mould. This method is highly time-consuming. The presence of a thin layer of metal used for making the master conductive and which, in practice, usually consists of silver also may be a drawback. Silver is easily tarnished, for example in an atmosphere which contains only traces of hydrogen sulphide.

It is an object of the invention to provide a method which is considerably simpler.

According to the invention the object is obtained by subjecting to a mechanical machining precision operation in a last processing stage the aluminum coating obtained by the electrodeposition of aluminum of a layer at least 10 μm thick on an object having a metallic surface.

Surprisingly, it appeared that in contrast to aluminum which was obtained in a different manner, electroplated aluminum can be processed into an optically perfect surface by means of machining, even when the layer is only 10 μm thick. Of course the operations must be performed with a higher degree of precision, namely by so-called superfine milling and turning by means of tools, having diamond cutting faces. However, in contrast to aluminum obtained in a different manner, which had numerous pits, even after superfine milling and turning, so that its surface is unsuitable for optical applications, the surface obtained in accordance with the invention has a perfect optical quality. The surface condition of the substrate layer need not satisfy stringent requirements; the ultimate shape must be approximated as well as possible.

All known aluminum electroplating baths can be used as the plating solution. However, baths comprising an anhydrous aluminum compound together with an alkali-aluminum hydride or an alkaline earth-aluminum hydride in an aprotic solvent are preferred. Examples of such baths are the bath described in the U.S. Pat. No. 3,929,611, which consists of anhydrous aluminum chloride and lithium aluminum hydride in diethylether or ethyl-n-butyl ether or the bath described in the G.B. patent specification No. 1,547,743, consisting of similar compounds in an inert aprotic solvent with ether structure and having a flash point above 40° C. and defined by the formula $RO-(CH_2)_m-O(CH_2)_n-OR'$ (m and n being between 1 and 6) or, finally, the bath described in the non-published Netherlands patent application No. 7805490, consisting of an alkali aluminum hydride or alkaline earth aluminum hydride and an aluminum hydride which is coordinatively bound to a tertiary amine, an aryl phosphine or a tertiary diamine, dissolved in an aprotic solvent.

The deposited aluminum need not be superpure: it may contain up to approximately 1% by weight of metallic impurities. It is essential that it does not contain seggregates which might cause pits during machining. The hardness must be uniform and be above a value of 40 Vickers.

Superfine turning and milling are known techniques which are, for example, described in an article by P. Silveri in the "Industrial Diamond Review", April 1978, pages 119–121 entitled "Producing mirror finishes is an important technology".

The aluminum must, of course, properly adhere to the substrate layer. If necessary, before deposition of the aluminum the surface to be plated is subjected to an activating pre-treating or an etching operation.

A number of specific embodiments will now be described by way of example.

1. A cylinder having a diameter of 30 mm and a height of 15 mm, consisting of an aluminum alloy and having the following specification in 1% by weight:
Mg: 0.50–2.00
Si: 0.50–1.50
Mn: 0.20–1.50
Fe: $\leq 0.40$
Cu: $\leq 0.05$
other impurities together $\leq 0.10$
Al remainder
is etched in a 5 N NaOH-solution for some seconds, thereafter in concentrated $HNO_3$ for 15 seconds and 1 minute in $HNO_3$ 1:1, respectively, and kept in a HF-solution (1:4) for 15 seconds. Thereafter, the object is rinsed in ethanol and thereafter in ether.

A 35 μm thick aluminum layer is deposited on the cylinder from a solution of
1.2 mole $AlCl_3$ and
0.4 mole $LiAlH_4$ in tetrahydrofurane.
Electroplating was effected for 2.5 hours at a current of 350 mA. The layer had a hardness of 50 Vickers.

The cylinder thus coated with an electroplated aluminum layer is turned by means of a diamond chisel (radius 0.5–1.0 mm' on a precision lathe with a feed of 10 μm. A properly adhering, reflecting surface is obtained, having a surface roughness $R_T$ of approximately 0.01 μm.

Similar results are obtained when the aluminum is electro-deposited from a solution having the following composition
0.5 mole $LiAlH_4$
34 g $AlH_3.N(C_2H_5)_3$ per 1 liter of diethylene glycol methyl ether with a current of approximately 100 mA or with a bath made by dissolving 158.3 g of the compound $AlCl_3.2C_4H_8O$ in 213.6 g of diethylene glycol dimethyl ether to which 3.15 g $LiAlH_4$ is thereafter added. The above-mentioned compounds in which $C_4H_8O$ represents tetrahydrofurane is prepared by dissolving 200 g $AlCl_3$ in a mixture of 80 g dry diethyl ether and 170 g dry tetrahydrofurane and by filtering off the formed precipitate.

2. A hollow concave mirror having a diameter of 52 mm formed of the aluminum alloy of example 1 is degreased in concentrated $H_2SO_4$ (d=1.84) for 3 minutes, kept in a HF-solution (1:4) for 15 seconds, rinsed in $HNO_3$ (1:1) an in deionised water.

The mirror is then kept for 30 seconds in an aqueous solution containing 1.4 g/l KOH and 25–40 g/l $SnCl_2$ and thereafter subjected for 2 minutes to an electroplating operation in an aqueous solution having the composition $CuCl_2$: 15 g/l
KCN: 18 g/l
KOH: 2 g/l
$SnCl_2$: 25–40 g/l at a current density of 5 A/dm² with a bronze anode, resulting in the formation of a Cu-Sn layer, approximately 5 μm thick, on the surface of the mirror.

Thereafter, the mirror is rinsed, in this order, in water, sulphuric acid, water, ethanol and diethyl ether. Thereafter, aluminum is electrodeposited in the same manner as described in example 1 and the reflecting side is turned on a precision lathe with a diamond chisel, the surface having a surface roughness $R_T$ of approximately 0.01 μm.

3. A copper cylinder having a diameter of 30 mm and a height of 15 mm is degreased in trichloroethylene. The cylinder is kept in concentrated $HNO_3$ for 20 seconds and then rinsed in $HNO_3$ (1:1) and in deionised water. Thereafter the cylinder is immersed in a HF-solution (1:4) for 20 seconds and rinsed in deionised water. A Cu-Sn-layer is applied in the same manner as described in example 2, electroplating being performed for 2 minutes at 3 A/dm². After rinsing and immersing in a 10% $H_2SO_4$-solution the cylinder is rinsed in deionised water, ethanol and tetrahydrofurane. An aluminum layer is applied in 120 minutes at 1 A/dm² from a solution of 1.2 mole $AlCl_3$ and 0.4 mole $LiAlH_4$ in tetrahydrofurane and thereafter rinsed in water and ethanol. The reflecting side of the object is then turned on a precision lathe with a diamond chisel as described for example 1. The surface-roughness ($R_T$) obtained is approximately 0.01 μm.

4. An Ni-layer is deposited by electroless deposition on a cylinder consisting of "Macor" and having a diameter of 27 mm and thereafter an aluminum layer is electroplated in the same manner as described for example 1. After having been thoroughly degreased the cylinder is rinsed in deionised water for some hours in a HF/HCl-solution for 1 minute and thereafter rinsed in deionised water for 1 minute. A nucleating layer is applied to the surface of the cylinder by immersing it for 1 minute in a solution of 0.1 g stannic (II) chloride and 0.1 ml concentrated hydrochloric acid in 1 l deionised water.

Thereafter the cylinder is rinsed for 1 minute in deionised water, kept for 1 minute in a solution of 1 g silver nitrate in 1 l deionised water, rinsed for 1 minute in deionised water, kept for 1 minute in a solution of 0.1 mg palladium chloride and 3.5 ml concentrated hydrochloric acid in 1 l deionised water, and finally rinsed for 1 minute in deionised water.

The palladium-activated surface is electroless plated for 29 seconds at a temperature of 95° C. in a solution having a pH of 3.8 and consisting of 30 g $NiCl_2.6H_2O$
30 g amino-acetic acid
10 g $NaH_2PO_2.H_2O$ (Na-hypophosphite)

in 1 l deionised water.

After a deionised water rinse the resultant nickel-coated cylinder is placed during 5 minutes in a drying stove at 220° C. Thereafter it is plated in the same solution as mentioned above but now for 10 minutes. For 2 minutes at 3 A/dm² a Cu-Sn-layer is then provided by means of the alkaline $SnCl_2$ solution, described in example 2. After a deionised water rinse, immersion in a 10% $H_2SO_4$-solution, rinsing in deionised water, ethanol and tetrahydrofurane an aluminum layer is applied by means of electroforming. This is done in a solution of 1.2 mole $AlCl_3$ and 0.4 mole $LiAlH_4$ in tetrahydrofurane for 2 hours at a current density of 1 A/dm². The cylinder is then rinsed in deionised water and in ethanol and thereafter dried. As in the preceding examples the layer had a hardness of approximately 50 Vickers. Finally, the object is turned on a precision lathe with a diamond chisel as described for example 1. A smooth, reflective surface is obtained having a surface-roughness $R_T$ of about 0.01 μm. The "Macor" used in this example is a properly machineable glass ceramic material, which is marketed by Corning Glass Works. It is obtained by thermal devitrification of a glass having the following nominal composition (1), which results in a glass-ceramic consisting of a crystalline phase (2), dispersed in a vitreous matrix having the composition (3) in a weight % ratio of approximately 55:45%.

|  | Composition in wt. % | | |
| --- | --- | --- | --- |
|  | (1) | (2) | (3) |
| $SiO_2$ | 47,2 | 42,8 | 50,7 |
| $Al_2O_3$ | 16,7 | 13,7 | 19,4 |
| MgO | 14,5 | 27,3 | 4,5 |
| $K_2O$ | 9,5 | 10,7 | 8,5 |
| F | 6,3 | 8,1 | 4,4 |
| $B_2O_3$ | 8,5 | 0,8 | 14,4 |
|  | 102,7 | 103,4 | 101,9 |
| correction F→O | −2,7 | −3,4 | −1,9 |

What is claimed is:

1. A method of producing an article having an aluminum surface with a surface with a maximum surface roughness $R_T$ of not more than 0.02 microns comprising forming by electroplating a layer of aluminum of at least 10 microns thick on an article having a metallic surface and then subjecting said aluminum surface to a mechanical polishing operation.

2. The method of claim 1 wherein the mechanical polishing operation is a cutting operation.

3. The method of claim 2 wherein the cutting operation is carried out by diamond tools.

4. The method of claim 1 wherein the aluminum layer is obtained from an electroplating bath containing an anhydrous aluminum compound and an alkali aluminum hydride or an alkaline earth aluminum hydride in an aprotic solvent.

* * * * *